3,288,614
PROCESS OF PRODUCING MILK FROM SOY BEANS

Charles P. Miles, Riverside, Calif., assignor to Pacific Union Association of Seventh Day Adventists, doing business as Loma Linda, Foods, Riverside Calif., a corporation of California
No Drawing. Filed Nov. 2, 1964, Ser. No. 408,334
15 Claims. (Cl. 99—64)

This invention relates to the production of soy milk from soya beans and has as its general object to improve upon processes hitherto used. Specific objects of the invention are to provide a method of producing soy milk:

(1) Providing a considerable saving in raw material in relation to the volume of the end product.
(2) Providing a considerable reduction in processing time in relation to the volume of material being processed.
(3) Providing improved sanitation.
(4) Providing improved color in the end product.
(5) Avoiding bacterial contamination, and enzymatic action during processing.
(6) Avoiding damage to homogenizer valves.
(7) Improving standardization and quality control.

Other objects and advantages of the invention will become apparent in the ensuing specification and appended claims.

In the past a common practice in the production of soy milk has been to first subject a quantity of soy beans to prolonged soaking; to grind the soaked beans into a slurry; to centrifuge such slurry in order to extract the liquid therefrom; to subject the extracted liquid to pressure cooking and formulating (additive) steps; to then homogenize the formulated soy milk; and to then process the product into containers. In that process a considerable percentage of the finer edible content of the soy bean was lost by discarding it along with the coarser fibers removed in the centrifuging operation. A need for a more efficient process for extraction of the homogenizable content of the bean has been apparent for some time.

The present invention departs from the older process in a number of respects. The pre-soaking of the soy beans and the grinding of the water-softened beans are both eliminated. Hulls are removed at the outset from the unmoistened beans by cracking and winnowing steps, whereas in the older process, reliance was placed upon the softening and loosening of the hulls in the soaking process followed by a series of washing steps to wash away the hulls. Instead of the grinding of water-softened beans, the present invention utilizes a step of reducing the cracked, dehulled beans to fine flake form from which they are converted directly to an instant slurry by the addition of water. Instead of pre-centrifuging the coarse slurry developed from the ground soaked beans prior to homogenizing in order to protect the homogenizer valves from damage arising from the forcing of solid particles through the homogenizer valves, the present invention utilizes a high pressure homogenizing step in which the slurry is homogenized before it is passed through a centrifugal clarifier.

In the older process, the time elapsed between the soaking of the beans and the treatment of the extract in the cooker was sufficiently long for a substantial bacterial growth to occur at the temperature of the intervening processing steps, and the extraction process was too slow to match the speed of vacuum pans of substantial capacity that were then available. Avoidance of bacterial contamination was a substantial problem. In the process of the present invention, bacterial growth and enzymatic action are arrested almost at the beginning of the process, i.e., immediately after mixing the soy bean flakes with water. This is accomplished by cooking the slurry and then promptly subjecting it to high pressure homogenization.

By developing an instant slurry from flaked unmoistened beans mixed with water immediately before cooking and homogenization, the invention has effected a savings of more than 15% reduction in the quantity of beans required for the production of a given quantity of milk. For example, in the operation of my improved process, one batch of ingredient utilizing 350 pounds of bean flakes represents a savings of about 70–80 pounds of beans over the previous method of soaking and grinding the whole beans of a comparable batch (producing the same volume of end product).

Describing my improved process in detail, it involves the following steps, performed in the order in which they are named:

Example I (a) Selection is made of soy beans having the following requisites: (1) a satisfactory variety; (2) with a moisture content in the range of 10% to 14% of water by weight; and (3) clean.

(b) The selected beans are cracked in their "dry" condition (without addition of moisture). The hulls are loosened by the cracking.

(c) Dehulling is accomplished by winnowing, e.g. by passing a stream of air through the cracked "dry" beans during free-fall thereof from one portion to another portion of a conveyor system by which the cracked beans are conducted to flaking rolls. The hulls are blown away from the cracked beans.

(d) In their original "dry" state, without the addition of moisture, the dehulled, cracked beans are passed through flaking rolls between which they are rolled under heavy pressure into very thin flakes (of a thickness in the range of .003 inch to .008 inch). This flaking step is performed promptly following the cracking and dehulling steps, so that the cracked beans may have no opportunity to dry out.

(e) Water (which can be either hot or cold) is now added to the soy flakes at a ratio in the range between 1 pound of beans to 1 gallon of water and 50 pounds of beans to 32 gallons of water. The slurry is agitated from a minimum extent where blending will be barely attained, up to a period as long as one half hour. The slurry is composed of particles having a maximum dimension substantially limited to the thickness of the flakes from which it is developed.

(f) A stabilizer of the phosphate type, or a sequestering agent such as EDTA is then added to the slurry.

(g) The slurry is then pressure cooked at a temperature in the rangs of 220° F. to 250° F., for a period of time in the range from a mere flash to a maximm of 10 minutes' duration.

(h) The cooked slurry, without being subjected to any separation step, is directly subjected to high pressure homogenization (e.g. by using a Manton Gaulin homogenizer) at a pressure in the range of 5,000 p.s.i. to 8,000 p.s.i. I find that the slurry made from the flaked beans, due to the reduction of all solid portions of the bean to extremely small dimension as represented by the thickness of the flakes, after pressure cooking, will be in a sufficiently finely divided state to avoid damage to the homogenizer valves, which would be likely to occur from the forcing of any particles of substantial size through the valves.

(i) The slurry is then clarified by pumping it through a centrifugal separator such as a De Laval or Westphalia, with a flush cycle of 2 to 5 minutes. More specifically, the slurry is pumped into the centrifuge for a period of 2 to 5 minutes; the pumping is then arrested, and after a short interval sufficient to empty the centrifuge of its liquid content, it is back-flushed to remove the solid residue accumulated therein during the centrifuging cycle.

(j) The liquid extracted from the centrifuge is then pumped into a formulation tank where oil, carbohydrate (including sugar), vitamins and minerals are added in accordance with the requirements for a whole type milk or a skim type milk to equal the standards for dairy milk (or for mother's milk where the product is prepared for infants).

(k) The formulated milk is then subjected to the conventional milk-homogenizing step at a pressure in the range of 1,500 to 3,500 p.s.i. Any conventional homogenizer may be used for this homogenizing step, which can be performed either before or after condensing.

(l) The homogenized milk is then evaporated in a vacuum pan to produce a proper density for direct use, or to produce a condensed milk which can be diluted with an equal volume of water.

(m) The condensed milk is then passed through a heat exchanger and on to a cold storage tank for standardization. From the cold storage tank the milk is packaged into containers to be sold as fresh milk.

*Example II*

After production of the milk by the process described above, further processing is utilized when longer storage is contemplated.

The further processing steps comprise: (n) passing the milk through a heat exchanger; (o) then canning it at temperatures in the range of 120° F. to a 140° F.; (p) then procesing the cans in a continuous sterilization step in which the cans move continuously through a sterilizer at 245° F. to 255° F. for a period in the range of 8 to 12 minutes; (q) then immediately cooling the cans to a temperature in the range of 90° F. to 100° F. The final canned milk product is light in color, of creamy consistency, and has a solid content of 11% to 25.5%.

*Example III*

Where the milk is to be converted into powdered form, after producing the milk according to Example I above, it may be subjected to spray-drying, chemical drying or freeze-drying. During the drying process, nitrogen or carbon dioxide may be introduced into the milk line before the milk enters the drying chamber, a compressor being utilized for this purpose. The resultant powdered milk is light in cloor, fluffy in texture, has instant solubility characteristics and a pleasing flavor. Moisture content is 2 to 4.5%. The powder is packed into paper cartons or tins and is further gassed with nitrogen.

I claim:

1. A process of producing soy milk, comprising the following steps: cracking a quantity of selected soy beans having a moisture content in the range of 10%–14% of water by weight; winnowing the cracked beans to remove the hulls; reducing the dehulled cracked beans to thin flakes while still in an unmoistened state; adding water to the resulting flakes to prepare a slurry therefrom; then pressure cooking the slurry for a period of time in the range from a mere flash to a maximum of 10 minutes duration; then subjecting the cooked slurry to high pressure homogenization; then centrifuging the homogenized slurry to remove fine solids; and then formulating the extracted liquid by the addition of selected ingredients, thus producing soy milk.

2. The method defined in claim 1, wherein the slurry is pressure cooked at a temperature in the range of 220° F. to 250° F.

3. The method defined in claim 1, where the slurry, without previous removal of solids is subjected to said high pressure homogenization step at a pressure in the range of 5,000 p.s.i. to 8,000 p.s.i.

4. The method defined in claim 1, wherein the slurry is pressure cooked immediately after it has been prepared and the cooked slurry is subjected to the high pressure homogenization step immediately after it has been cooked, for inhibiting bacterial contamination.

5. The method defined in claim 1, wherein a stabilizer comprising a phosphate is added to the slurry previous to cooking the same.

6. The method defined in claim 1, wherein the formulated milk is subjected to second homogenization step at a pressure lower than that of said high pressure homogenizing step.

7. The method defined in claim 1, wherein the flakes are reduced to extreme thinness in the range of .003–.008 inch thickness such as to limit solid particle size in the ensuing slurry to a dimension sufficiently small to avoid damage to homogenizer valves.

8. The method defined in claim 1, wherein the cracked beans, in said flaking step, are reduced to flakes having a thickness in the range of .003 inch to .008 inch.

9. A method of producing soy milk, comprising the folowing steps: (a) selecting clean soy beans having a moisture content in the range of 10% to 14% of water by weight (b) cracking the bean without substantially varying said moisture content (c) removing the hulls loosened by the cracking (d) flaking the cracked beans while maintaining said moisture content substantially unchanged so as to reduce them to flakes having a thickness in the range up to substantially .008 inch (e) adding water to said flakes to produce a slurry in which particle size is limited to a dimension in said thickness range and thus sufficiently small to avoid damage to homogenizer valves (f) pressure cooking the slurry for a period of time in the range from a mere flash to a maximum of 10 minutes duration without substantial delay following its preparation; (g) subjecting the cooked slurry to a high pressure homogenization without substantial delay following its cooking and without previous removal of solids; and (h) then centrifuging the homogenized slurry to remove the solids therefrom and to extract a liquid slurry milk.

10. The method defined in claim 9, wherein the slurry is prepared by mixing the soy flakes and water in a ratio in the range between 1 pound of beans to 1 gallon of water and 50 pounds of beans to 32 gallons of water.

11. The method defined in claim 9, including the steps of blending the slurry by subjecting it to agitation.

12. The method defined in claim 9, wherein the slurry is pressure cooked at a temperature in the range of 220° F. to 250° F. and for a period of time not exceeding 10 minutes duration.

13. The method defined in claim 9, wherein the slurry is subjected to pressures in the range of 5,000 p.s.i. to 8,000 p.s.i. in said high pressure homogenization step; and including the step of homogenizing the milk extracted in the centrifuging step at a pressure in the range of 1,500 to 3,500 p.s.i.

14. The method defined in claim 9, including the further steps of formulating the final milk product by the addition of selected oil, carbohydrate, vitamin and mineral ingredients to the liquid extracted in the centrifuging step; and then subjecting the formulated milk to a further homogenization at a pressure in the range of 1,500 to 3,500 p.s.i.

15. The method defined in claim 9, including the further step of extracting the water from the milk to produce a dry milk powder.

References Cited by the Examiner
FOREIGN PATENTS 485,331   5/1938   Great Britain.

OTHER REFERENCES

King et al.: The Solvent Extraction of Soybean Flakes, in Transactions—American Institute of Chemical Engineers. 40 (1944), pp. 533–535, TP 1.A6 99–98.

A. LOUIS MONACELL, *Primary Examiner.*

RAYMOND N. JONES, *Examiner.*

S. E. HEYMAN, *Assistant Examiner.*